(12) United States Patent
Strandberg et al.

(10) Patent No.: US 11,569,732 B2
(45) Date of Patent: Jan. 31, 2023

(54) DC-LINK CHARGING ARRANGEMENT AND METHOD FOR CHARGING A DC-LINK CAPACITOR

(71) Applicant: Vacon Oy, Vaasa (FI)

(72) Inventors: Stefan Strandberg, Vörå (FI); Nicklas Södö, Vaasa (FI)

(73) Assignee: Vacon Oy, Vaasa (FI)

( * ) Notice: Subject to any disclaimer, the term of this patent is extended or adjusted under 35 U.S.C. 154(b) by 328 days.

(21) Appl. No.: 16/924,864

(22) Filed: Jul. 9, 2020

(65) Prior Publication Data

US 2021/0013795 A1 Jan. 14, 2021

(30) Foreign Application Priority Data

Jul. 12, 2019 (DE) .......................... 102019118927.6

(51) Int. Cl.
| | | |
|---|---|---|
| *H02M 1/14* | (2006.01) | |
| *H02M 7/217* | (2006.01) | |
| *H02M 7/219* | (2006.01) | |
| *H02M 1/32* | (2007.01) | |
| *H02M 7/06* | (2006.01) | |
| *H02J 7/34* | (2006.01) | |
| *H02J 7/00* | (2006.01) | |
| *H02M 1/00* | (2006.01) | |

(52) U.S. Cl.
CPC ............ *H02M 1/143* (2013.01); *H02M 1/32* (2013.01); *H02M 7/06* (2013.01); *H02M 7/217* (2013.01); *H02M 7/219* (2013.01); *H02J 7/0068* (2013.01); *H02J 7/345* (2013.01); *H02J 2207/50* (2020.01); *H02M 1/0048* (2021.05); *H02M 1/322* (2021.05)

(58) Field of Classification Search
CPC .......... H02M 1/143; H02M 1/32; H02M 7/06; H02M 1/0048; H02M 1/322; H02J 7/0068; H02J 7/345; H02J 2207/50; Y02B 70/10
See application file for complete search history.

(56) References Cited

U.S. PATENT DOCUMENTS

| | | | | |
|---|---|---|---|---|
| 2,547,023 | A * | 4/1951 | Lense | ................. H04W 88/027 340/7.49 |
| 3,440,926 | A * | 4/1969 | Gura | ....................... F41A 19/64 89/137 |
| 5,491,624 | A * | 2/1996 | Levran | .................. H02M 7/219 363/44 |
| 5,627,738 | A * | 5/1997 | Lubomirsky | .......... H02H 9/001 361/58 |
| 5,923,152 | A * | 7/1999 | Guerrera | ............... H02M 3/158 363/127 |
| 8,804,383 | B2 * | 8/2014 | Zhan | ....................... H02M 1/36 323/901 |
| 10,270,367 | B2 * | 4/2019 | Sodo | ................... H02M 5/4585 |
| 10,756,641 | B2 * | 8/2020 | Portisch | ............... H02M 5/458 |
| 11,159,099 | B2 * | 10/2021 | Södö | ................. H02M 7/53875 |

(Continued)

*Primary Examiner* — Yusef A Ahmed
(74) *Attorney, Agent, or Firm* — McCormick, Paulding & Huber PLLC

(57) ABSTRACT

A DC-link charging arrangement is described having a DC-link capacitor, rectifier means, and contactor means arranged between supply voltage ports and the rectifier means and having at least one contactor. Such a charging arrangement should enable charging of a DC-link capacitor in a simple way with low losses. To this end a charging capacitor is arranged bridging the at least one contactor.

10 Claims, 2 Drawing Sheets

(56) References Cited

U.S. PATENT DOCUMENTS

| | | | |
|---|---|---|---|
| 2007/0182361 A1* | 8/2007 | Pande | H02P 1/029 318/812 |
| 2008/0259658 A1* | 10/2008 | Sodo | H02M 1/4266 363/37 |
| 2008/0284367 A1* | 11/2008 | Kawashima | H02M 1/126 318/700 |
| 2009/0140829 A1* | 6/2009 | Sodo | H02M 1/126 336/5 |
| 2010/0220416 A1* | 9/2010 | Yonezawa | H02M 3/155 361/13 |
| 2010/0308559 A1* | 12/2010 | Tarasinski | A01B 59/00 280/422 |
| 2011/0199061 A1* | 8/2011 | Shimada | H02M 5/293 323/237 |
| 2012/0307526 A1* | 12/2012 | Senanayake | H02M 3/1584 363/16 |
| 2013/0176753 A1* | 7/2013 | Swamy | H02M 1/4216 363/37 |
| 2014/0042817 A1* | 2/2014 | Zargari | H02M 1/32 307/77 |
| 2015/0054443 A1* | 2/2015 | Swamy | H02P 23/06 318/504 |
| 2015/0061382 A1* | 3/2015 | Roessler | H02M 1/32 307/10.1 |
| 2015/0171772 A1* | 6/2015 | Tallam | G01R 19/0007 363/41 |
| 2015/0318791 A1* | 11/2015 | Baumann | H02P 27/06 318/504 |
| 2015/0365019 A1* | 12/2015 | Yamamoto | H02H 7/16 318/490 |
| 2016/0126858 A1* | 5/2016 | Wu | H02M 1/126 363/89 |
| 2016/0308368 A1* | 10/2016 | Letas | H02J 3/44 |
| 2017/0310237 A1* | 10/2017 | Uda | H02M 7/217 |
| 2017/0331389 A1* | 11/2017 | Ahmed | H02M 1/08 |
| 2017/0331400 A1* | 11/2017 | Saha | H02P 29/00 |
| 2017/0366082 A1* | 12/2017 | Liu | H02P 7/04 |
| 2018/0108472 A1* | 4/2018 | Pagenkopf | H02P 27/16 |
| 2018/0309402 A1* | 10/2018 | Yoshida | B60L 3/003 |
| 2019/0013671 A1* | 1/2019 | Sodo | H02M 5/4585 |
| 2019/0123662 A1* | 4/2019 | Zhang | H02M 1/126 |
| 2020/0006970 A1* | 1/2020 | Chen | H02J 1/102 |
| 2020/0007030 A1* | 1/2020 | De Doncker | H02M 3/33507 |
| 2020/0044577 A1* | 2/2020 | Shikagawa | H02P 27/06 |
| 2020/0119634 A1* | 4/2020 | Perkiö | H02M 1/42 |
| 2020/0321852 A1* | 10/2020 | Steiper | G01R 19/16528 |
| 2021/0021205 A1* | 1/2021 | Horikoshi | H02M 7/125 |
| 2021/0028720 A1* | 1/2021 | Sakai | H02M 7/219 |
| 2021/0152077 A1* | 5/2021 | Strandberg | H02M 1/126 |
| 2021/0167715 A1* | 6/2021 | Tagawa | H02P 27/08 |
| 2021/0194353 A1* | 6/2021 | Thomas | H02M 1/4216 |
| 2021/0261009 A1* | 8/2021 | Eull | H02M 1/44 |
| 2022/0006395 A1* | 1/2022 | Hensler | H02M 7/125 |
| 2022/0029555 A1* | 1/2022 | Wang | H02M 1/123 |
| 2022/0037987 A1* | 2/2022 | Sodo | H02M 1/36 |
| 2022/0200330 A1* | 6/2022 | Paatero | H02J 9/061 |

\* cited by examiner

DC-LINK CHARGING ARRANGEMENT AND METHOD FOR CHARGING A DC-LINK CAPACITOR

CROSS-REFERENCE TO RELATED APPLICATION

This application claims foreign priority benefits under 35 U.S.C. § 119 to German Patent Application No. 102019118927.6 filed on Jul. 12, 2019, the content of which is hereby incorporated by reference in its entirety.

TECHNICAL FIELD

The present invention relates to a DC-link charging arrangement having a DC-link capacitor, rectifier means, and contactor means arranged between supply voltage ports and the rectifier means and having at least one contactor.

BACKGROUND

A DC-link is used to smooth a voltage produced by the rectifier means. In other words, a DC-link capacitor is used to maintain a voltage which is as constant as possible.

When the DC-link capacitor is uncharged, there is no charge in the capacitor to produce the voltage. In other words, the voltage over the DC-link capacitor is zero or almost zero. If the DC-link would be directly connected to the grid, this would cause a large current which would overload the remaining components.

It is therefore known to limit the charging current by means of charging resistors. However, the resistor charging has very poor efficiency. A large amount of the charging energy is dissipated as heat in the charging resistor.

SUMMARY

The object underlying the invention is to enable charging of a DC-link capacitor in a simple way with low losses.

This object is solved with a DC-link charging arrangement as described at the outset in that a charging capacitor is arranged bridging the at least one contactor.

The charging capacitor is arranged in parallel to the contactor. The term "contactor" is used in the general meaning of "switch". If the supply voltage ports are connected to a grid having a single or a plurality of phases, for example one, two or three phases, a respective contactor is arranged for each phase or at least one of the phases, e.g. in a two-phase system, and at least one contactor is connected in parallel to a charging capacitor or a charging capacitor arrangement having one, two, three or more charging capacitors. Accordingly, a charging current can pass the charging capacitor arrangement when the contactor is open. The charging capacitor limits the current and supplies the necessary electrical energy to the input of the rectifier means. The rectifier means can in particular be active rectifier means.

In an embodiment of the invention a filter arrangement having at least one filter capacitor between a phase and a mid-point of at least two phases is arranged between the contactor and the rectifier means, in particular active rectifier means. The filter arrangement can be, for example, a LCL filter arrangement which usually has, for each phase, a series connection of two inductances and a capacitor connected to the above mentioned mid-point which is also called "star-point". The LCL filter arrangement is used for dampening, filtering or switching of the rectifier.

In an embodiment of the invention the charging capacitor has a capacitance value having at least 25% of a capacitance value of the filter capacitor. The charging capacitor and the filter capacitor form a voltage divider. When the main voltage is applied to the input side of the charging capacitors, the charging capacitors will limit the current but charge the DC-link to a level determined by the ratio of the charging capacitor and the filter capacitor.

In an embodiment of the invention the rectifier means is an active rectifier having a plurality of switches which are controlled by control means, the control means being configured to adjust a power angle between a voltage and the supply ports and a charging voltage at active rectifier ports to be close to 90°. In reality, it will hardly be possible to reach a power angle of 90°. However, the power angle should be as close to 90° as possible, preferably larger than 85°. Furthermore, the control means can adjust the voltage amplitude. This can be achieved by modulating the active rectifier with a modulation index as high as possible and turning the angle to 90° or close to 90°. When the power angle is close to 90° it maximizes the charging power of the DC-bus. The active rectifier may be connected to a LC filter or to a LCL-filter.

In an embodiment of the invention the control means are configured to reduce the power angle to zero and voltage amplitude to the same as the grid voltage before the contactor is closed. When the DC-voltage reaches its nominal value (or a bit above this value, e.g. 10%) the active rectifier is synchronized to the grid. To this end the power angle between the grid voltage and the voltage of the active rectifier is turned to zero and the voltage amplitudes are adapted to those of the grid voltage so that a voltage difference over the contactor is zero. The contactor will then be closed with no voltage across and practically no current through the charging capacitor. Then the active rectifier is ready to run.

In an embodiment of the invention an auxiliary power unit is connected to a point between the charging capacitor and a supply voltage port connected to the charging capacitor. Depending on the need to power up the DC-link it could be possible to use a similar capacitor connection to power up an auxiliary power unit.

In an embodiment of the invention an additional contactor is arranged in series with the charging capacitor. In this way it is possible to completely separate the charging arrangement from the grid.

In an embodiment of the invention the charging capacitor is arranged within the LCL filter arrangement. Accordingly, it is not absolutely necessary to arrange the charging capacitor on the grid side of the LCL filter.

In an embodiment of the invention the charging capacitor is arranged between a filter inductor and the filter capacitor. The charging capacitor can be located on either the grid or the inverter side of the grid side inductor in the LCL filter.

The invention relates to a method for charging a DC-link capacitor connected to rectifier means.

The above mentioned object is solved in that the rectifier means are supplied from voltage ports by means of a charging capacitor bridging an open contactor.

The charging capacitor is arranged parallel to the contactor. Even if the contactor is open, it is possible to supply electric energy over the charging capacitor to the rectifier or inverter.

In an embodiment of the invention a voltage supplied to the rectifier means is filtered by means of a LCL filter. This adds an additional capacitor between the charging capacitor and the rectifier. Accordingly, a voltage divider is formed limiting the voltage supplied to the rectifier means.

In an embodiment of the invention the rectifier means are controlled to adjust a power angle between a voltage at the supply voltage ports and a charging voltage to be close to 90°. Accordingly, the charging power to the DC-link capacitor is maximized.

In an embodiment of the invention the rectifier means are controlled to reduce the power angle to zero before the contactor is closed. When the power angle between the grid voltage and the active rectifier voltage is turned to zero, the main contactor can be closed with no voltage across it and practically no current through the charging capacitor.

BRIEF DESCRIPTION OF THE DRAWINGS

The invention is now described in more detail with reference to the drawing, in which.

DETAILED DESCRIPTION

Figure 1:
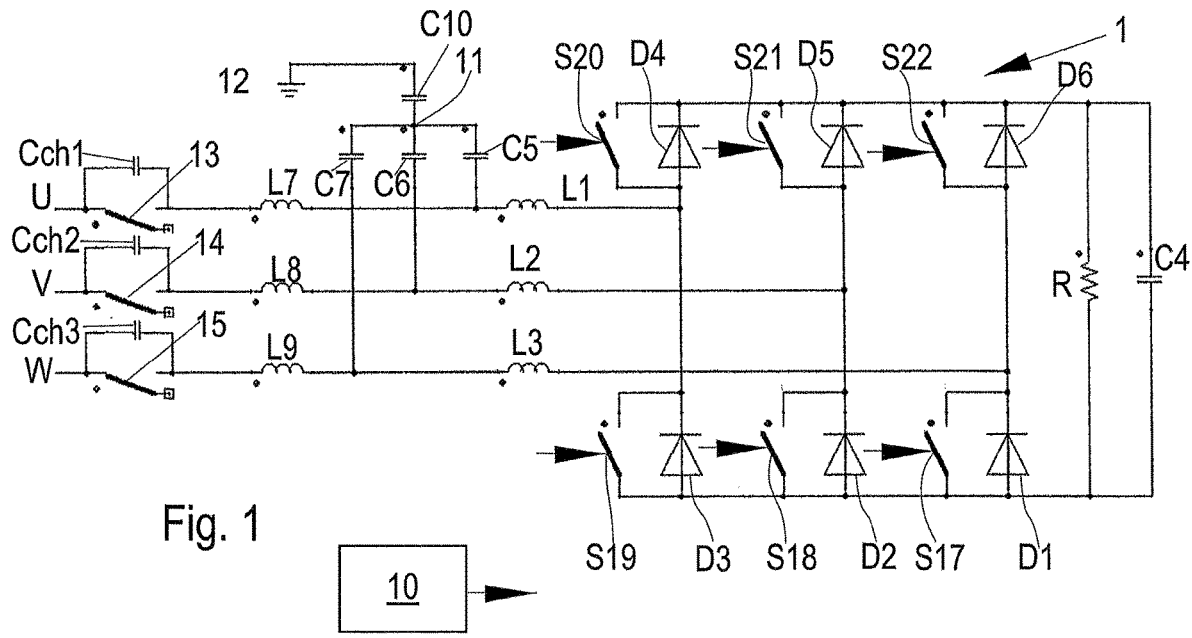
FIG. 1 shows a circuit diagram of a DC-link charging arrangement.

FIG. 1 shows schematically a circuit 1 having three supply voltage ports U, V, W to be connected to a three-phase grid. In order to simplify the following explanation the three phases within the circuit 1 are denoted as U, V, W, as well. Furthermore, the circuit 1 comprises an active rectifier having a bridge arrangement of six controlled switches S17, S18, S19, S20, S21, S22, wherein each switch is connected in parallel with a diode D1, D2, D3, D4, D5, D6.

The switches S17-S22 are controlled by control means 10. The connections between the control means 10 and the switches S17-S22 are symbolized by arrows.

A LCL filter is arranged between the supply port arrangements U, V, W and the rectifier means. The LCL filter comprises two inductors L1, L7 in series connection in phase U. A capacitor C5 connects a connecting point between the two inductors L1, L7 with a mid-point 11 (also called "star point"). The mid-point 11 is connected via a capacitor C10 to ground 12.

In the same way the phase V comprises a series connection of two inductors L2, L8, the connecting point of which is connected via a capacitor C6 to the mid-point 11. The phase W comprises a series connection of two inductors L3, L9 the connecting point of which is connected via a capacitor C7 to the mid-point 11.

The side of the rectifier means on which the LCL filter is arranged is also called "grid side".

On the other side of the rectifier means a parallel connection of a resistance R and a DC-link capacitor C4 is connected to the rectifier means, more precisely to the cathode of diode D6 and to the anode of diode D1.

A first contactor 13 is arranged between voltage supply port U and inductor L7 in phase U. A second contactor 14 is arranged between the voltage supply port V and inductor L8 in phase V. A third contactor 15 is arranged between the supply voltage port W and inductor L9 in phase W.

All contactors 13-15 are shown in open condition which will be explained later on.

A first charging capacitor Cch1 is arranged in parallel with first contactor 13. A second charging capacitor Cch2 is arranged in parallel with second contactor 14. A third charging capacitor Cch3 is arranged in parallel with third contactor 15.

Preferably, the capacitance value of the charging capacitors Cch1, Cch2, Cch3 is in a range from 25% to 50% of the capacitance value of the filter capacitors C5, C6, C7. However, in some designs the upper value can be even more than 100%.

When the grid voltage is supplied to the supply voltage ports U, V, W the charging capacitors Cch1, Cch2, Cch3 will limit the current, but charge the DC-link to a level determined by the ratio of the charging capacitors and the filter capacitors. Accordingly, the voltage reaching the rectifier means is limited.

The rectifier means needs some voltage to be able to work, for example, when the switches S17-S22 are in form of IGBT.

When the voltage at the filter capacitors C5-C7 has reached a sufficient level, which could be, for example, about $\frac{1}{10}$ to $\frac{1}{5}$ of the nominal DC-link voltage, the switches S17-S22 start to modulate with a modulation index as high as possible under control of the control means 10.

In this stage of operation the power angle of the modulated voltages and the grid voltage is adjusted to be close to 90°. This is symbolized in FIG. 2.

The left diagram shows the grid voltage $U_g$ and a voltage $U_a$ to the rectifier means. The voltage to the rectifier means increases from $U_{a\_start}$ to $U_{a\_charg}$. Using a power angle close to 90° maximizes the charging power to the DC-link capacitor C4. This will cause the power to flow from the grid through the charging capacitors Cch1-Cch3 to the DC-link capacitor C4 or more general the total capacitance of a large common DC-bus or DC distribution. The size of the charging capacitors Cch1-Cch3 gives the power limit for the charging.

Figure 3:
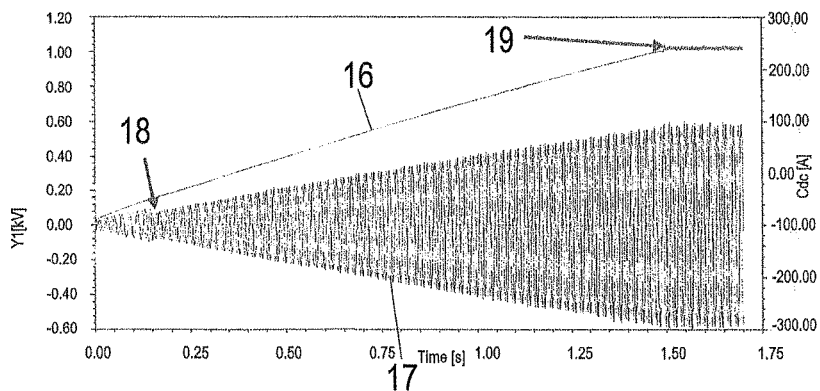
FIG. 3 shows a DC-link voltage and a filter phase voltage.

The charging differs from a resistor charging in that way that the DC-link voltage rises almost linearly, as shown in FIG. 3 with line 16.

When DC-link voltage reaches its nominal value, it can still go a bit above this value, i.e. 10%, to enable the synchronization of the active rectifier to the grid.

Figure 2:
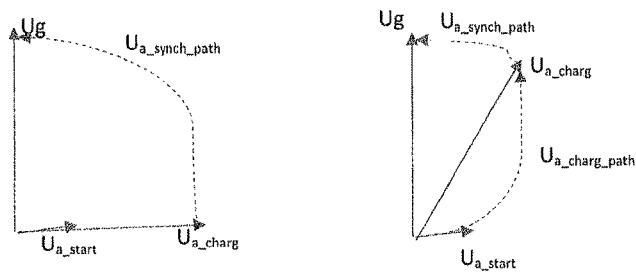
FIG. 2 shows voltage vectors during charging and synchronization.

When the DC-link voltage is e.g. 110% of the nominal voltage, the power angle between the grid voltage $U_g$ and the active rectifier voltage $U_a$ is turned to zero, as shown in the right graph of FIG. 2. When the power angle has reached its minimum value, the contactors 13-15 are closed with no voltage across it and practically no current through the charging capacitor Cch1-Cch3. The circuit 1 is then ready to run.

FIG. 3 shows the voltages 17 on the phases U, V, W. An arrow 18 indicates the start of the modulation. An arrow 19 indicates the point of synchronization.

Figure 4:
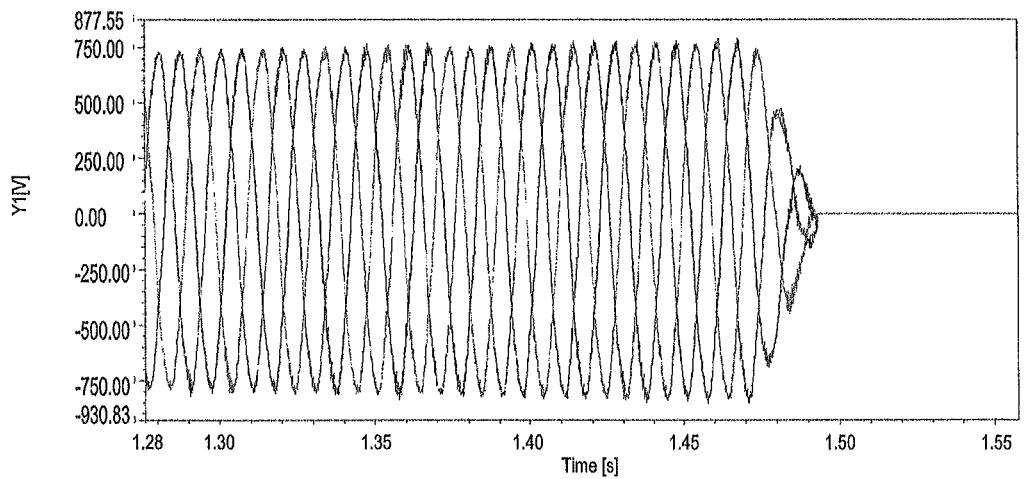
FIG. 4 shows the voltage over the charging capacitor during charging and at an end phase of the charging.

FIG. 4 shows the end of the charging when the phase voltage over the contactors 13-15 reaches a value of zero.

Figure 5:
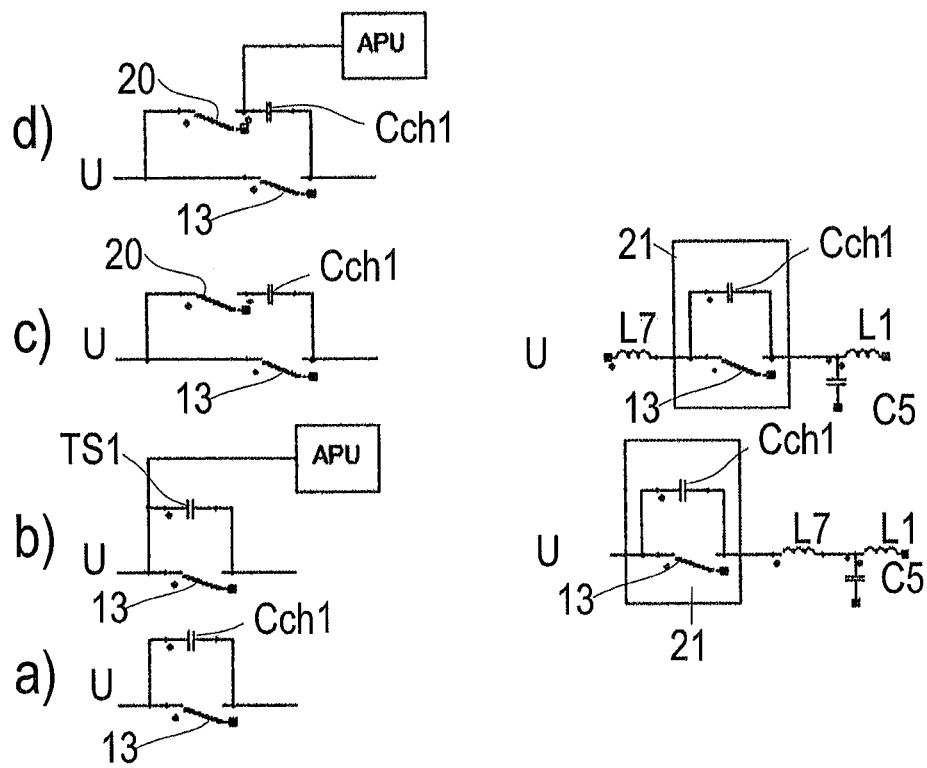
FIG. 5 shows some examples of different configurations.

FIG. 5 shows a few different circuit configurations. For the sake of simplicity only one phase is shown, but the same configuration can be used in each phase of a three-phase or multi-phase grid.

FIG. 5a shows the configuration which has been described in connection with FIG. 1.

FIG. 5b shows in addition an auxiliary power unit APU which is connected to the grid side of the charging capacitor Cch1 and the contactor 13.

Depending on the need to power up the circuit it could be possible to use a similar capacitor connection to power up the auxiliary power unit.

FIG. 5c shows a configuration in which the grid side of the charging capacitor Cch1 is connected to the grid side of the contactor 13 by means of an additional contactor 20. The additional contactor 20 makes it possible to separate completely the circuit 1 from a grid.

FIG. 5d is a combination of FIG. 5b and FIG. 5c, e.g. an auxiliary power unit APU is connected to the grid side of charging capacitor Cch1 and the auxiliary contactor 20 is arranged between the grid side of contactor 13 and the grid side of the additional contactor 20.

FIG. 5e shows again a configuration which has been shown in FIG. 1, i.e. the parallel connection 21 of first contactor 13 and first charging capacitor Cch1 is arranged on the grid side of the LCL filter, more precisely on the grid side of the series connection of the two inductors L7, L1.

However, it is also possible to arrange the parallel connection 21 of contactor 13 and charging capacitor Cch1 between the two inductors L1, L7 of the LCL filter. Hereby it is preferred that the parallel connection 21 is arranged between the inductor L7 and the filter capacitor C5. In other words, the parallel connection can be located on either the grid or the rectifier side of the grid side conductor L7 in the LCL filter.

In the description above the circuit 1 has been described in connection with an active rectifier. However, it is clear to the person skilled in the art that such an active rectifier can also be used as inverter.

The invention has been shown using a three-phase-grid as an example. However, the invention can be used as well with a single-phase-grid having only one phase and ground, or with a two-phase-grid. Another number of phases is possible as well.

The embodiment shown comprises a charging capacitor connected in parallel to each of the contactors 13, 14, 15.

However, when a single-phase grid or a two-phase-grid is used, it is sufficient to use only one contactor and accordingly only one charging capacitor in parallel to this contactor. It is as well possible to use two contactors, one in each phase or one in the single phase and one in the ground connection, and to arrange only one charging capacitor in parallel to one of these contactors.

Even in a multi-phase-grid, like a three-phase-grid, it is not necessary to arrange a charging capacitor in parallel to all contactors 13-15.

It is, for example, possible to arrange a charging capacitor only in parallel to two of the contactors 13, 14 or to one contactor 13. If necessary, the grid can be controlled in an appropriate way, i.e. to use only a current path in which at least one contactor is arranged and in which at least one contactor is bridged by a charging capacitor.

It is likewise possible to arrange the contactors and the at least one charging capacitor between the filter and the rectifier.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A DC-link charging arrangement having a DC-link capacitor, rectifier means, and contactor means arranged between supply voltage ports and the rectifier means and having at least one contactor, wherein a charging capacitor is arranged bridging the at least one contactor, wherein the rectifier means is an active rectifier having a plurality of switches which are controlled by control means, the control means being configured to adjust a power angle between a voltage at the supply voltage ports and a charging voltage at active rectifier ports to be close to 90°, wherein the control means are configured to reduce the power angle to zero and voltage amplitude to be the same as grid voltage before the at least one contactor is closed, and wherein an auxiliary power unit is connected to a point between the charging capacitor and a supply voltage port of the supply voltage ports that is connected to the charging capacitor.

2. The DC-link charging arrangement according to claim 1, wherein a filter arrangement having at least one filter capacitor connected between a phase and a mid-point of at least two phases is arranged between the at least one contactor and the rectifier means.

3. The DC-link charging arrangement according to claim 2, wherein the charging capacitor has a capacitance value at least 25% of a capacitance value of the at least one filter capacitor.

4. The DC-link charging arrangement according to claim 3, wherein an additional contactor is arranged in series with the charging capacitor.

5. The DC-link charging arrangement according to claim 2, wherein an additional contactor is arranged in series with the charging capacitor.

6. The DC-link charging arrangement according to claim 1, wherein an additional contactor is arranged in series with the charging capacitor.

7. The DC-link charging arrangement according to claim 1, wherein the charging capacitor is arranged within an LCL filter arrangement.

8. The DC-link charging arrangement according to claim 7, wherein the charging capacitor is arranged between a filter inductor and at least one filter capacitor.

9. A method for charging a DC-link capacitor connected to rectifier means, the method comprising supplying the rectifier means from supply voltage ports by means of a charging capacitor bridging an open contactor, controlling the rectifier means with control means, the rectifier means being an active rectifier having a plurality of switches, adjusting, by the control means, a power angle between a voltage at the supply voltage ports and a charging voltage at active rectifier ports to be close to 90°, and reducing, by the control means, the power angle to zero and voltage amplitude to be the same as grid voltage before the open contactor is closed, wherein an auxiliary power unit is connected to a point between the charging capacitor and a supply voltage port of the supply voltage ports that is connected to the charging capacitor.

10. The method according to claim 9, wherein a voltage supplied to the rectifier means is filtered by means of an LCL filter.

* * * * *